US011182360B2

(12) United States Patent
Das et al.

(10) Patent No.: US 11,182,360 B2
(45) Date of Patent: Nov. 23, 2021

(54) DATABASE TUNING AND PERFORMANCE VERIFICATION USING CLONED DATABASE

(71) Applicant: Microsoft Technology Licensing, LLC, Redmond, WA (US)

(72) Inventors: Sudipto Das, Redmond, WA (US); Vivek R Narasayya, Redmond, WA (US); Gaoxiang Xu, Redmond, WA (US); Surajit Chaudhuri, Redmond, WA (US); Andrija Jovanovic, Redmond, WA (US); Miodrag Radulovic, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 16/247,488

(22) Filed: Jan. 14, 2019

(65) Prior Publication Data

US 2020/0226109 A1    Jul. 16, 2020

(51) Int. Cl.
*G06F 16/00* (2019.01)
*G06F 16/21* (2019.01)
*G06F 16/27* (2019.01)

(52) U.S. Cl.
CPC ............ *G06F 16/217* (2019.01); *G06F 16/27* (2019.01)

(58) Field of Classification Search
CPC ........ G06F 16/217; G06F 16/27; G06F 16/21; G06F 16/22; G06F 16/2282;
(Continued)

(56) References Cited

U.S. PATENT DOCUMENTS 6,266,658 B1   7/2001   Adya et al.
7,406,477 B2   7/2008   Farrar et al.
(Continued)

OTHER PUBLICATIONS

Self-Tuning Database Systems: A Decade of Progress, Chaudhuri et al., (Year: 2007).*

(Continued)

*Primary Examiner* — Jean M Corrielus
(74) *Attorney, Agent, or Firm* — Schwegman Lundberg & Woessner, P.A.

(57) ABSTRACT

Systems, methods, and computer-executable instructions for reorganizing a physical layout of data of a database a database. A workload is selected from previously executed database operations. A total resource consumption of the previously executed database operations and of the workload is determined. The total resource consumption of the workload is more than a predetermined threshold of the total resource consumption of the previously executed database operations. Optimization operations for the database are determined using the workload. A cloned database of the database is created. The optimization operations are executed on the cloned database. A database operation is received for the database. The database operation is executed on the database and the cloned database. The performance of the cloned database is verified as being improved compared to the performance of the database based on the executing of the database operation on the database and the cloned database.

20 Claims, 4 Drawing Sheets

(58) Field of Classification Search
CPC .... G06F 11/3409; G06F 16/951; G06F 17/18; G06F 17/277; G06F 17/30864; G06F 40/284; G06F 40/258; G06F 40/44; G06F 16/9537; G06F 16/9535; G06F 16/285; G06F 16/24578; G06F 16/00; G06F 17/30; G06F 16/2379; G06F 16/2358; G06F 16/219; G06K 9/6267; G06K 9/6223; G06Q 10/04; G06Q 30/0205
See application file for complete search history.

(56) References Cited

U.S. PATENT DOCUMENTS

| | | | |
|---|---|---|---|
| 7,634,457 | B2 | 12/2009 | Lawande |
| 7,747,606 | B2* | 6/2010 | Dageville ............. G06F 16/217 707/713 |
| 8,489,565 | B2 | 7/2013 | Balasubramanian et al. |
| 8,903,801 | B2* | 12/2014 | Belknap ............. G06F 16/2462 707/713 |
| 9,135,299 | B2 | 9/2015 | Burger |
| 9,720,941 | B2* | 8/2017 | Belknap ............. G06F 16/217 |
| 9,996,582 | B2* | 6/2018 | Chamberlin ...... G06F 16/24542 |
| 10,061,678 | B2* | 8/2018 | Jovanovi ............. G06F 11/3034 |
| 2003/0093408 | A1* | 5/2003 | Brown ............... G06F 16/2272 |
| 2004/0034643 | A1 | 2/2004 | Bonner et al. |
| 2005/0125427 | A1* | 6/2005 | Dageville ......... G06F 16/24549 |
| 2006/0026179 | A1* | 2/2006 | Brown ................. G06F 16/217 |
| 2006/0085484 | A1* | 4/2006 | Raizman ............ G06F 16/2282 |
| 2007/0288495 | A1* | 12/2007 | Narasayya ............ G06F 16/217 |
| 2010/0250504 | A1* | 9/2010 | Balasubramanian ....................... G06F 16/2272 707/696 |
| 2011/0054642 | A1* | 3/2011 | Bondar ................. G05B 15/02 700/29 |
| 2014/0280373 | A1* | 9/2014 | Raitto ............... G06F 16/24542 707/803 |
| 2015/0081669 | A1 | 3/2015 | Belknap et al. |
| 2016/0004621 | A1 | 1/2016 | Gongloor et al. |
| 2016/0140176 | A1* | 5/2016 | Chamberlin .......... G06F 16/217 707/718 |
| 2016/0378634 | A1* | 12/2016 | Jovanovic ........... G06F 11/3034 707/688 |
| 2016/0378822 | A1 | 12/2016 | Jovanovic et al. |
| 2018/0096006 | A1* | 4/2018 | Das ....................... G06F 16/245 |
| 2020/0012734 | A1* | 1/2020 | Lee ..................... G06F 16/2455 |

OTHER PUBLICATIONS

Automatic Database Management System Tuning Through Large-scale Machine Learning, Aken et al., (Year: 2017).*

"Database Performance Tuning Guide", Retreived <<https://web.archive.org/web/20170828084222/http:/docs.oracle.com/cd/B28359_01/server.111/b28274/sql_tune.htm>>, Aug. 28, 2017, 13 Pages.

Ljepava, et al., "Find and apply performance recommendations", Retrieved <<https://docs.microsoft.com/en-us/azure/sql-database/sql-database-advisor-portal>>, Jan. 4, 2018, 8 Pages.

Popovic, et al., "Automatic index management in Azure SQL database", Retrieved <<https://blogs.msdn.microsoft.com/sqlserverstorageengine/2017/05/16/automatic-index-management-in-azure-sql-db/>>, May 16, 2017, 5 Pages.

Sattler, et al., "Autonomous Query-driven Index Tuning", In Proceedings of International Database Engineering and Applications Symposium, Jul. 7, 2004, pp. 1-20.

"International Search Report and Written Opinion Issued in PCT Application No. PCT/US2019/068216", dated Mar. 25, 2020, 12 Pages.

* cited by examiner

DATABASE TUNING AND PERFORMANCE VERIFICATION USING CLONED DATABASE

BACKGROUND

A database with an appropriate set of indexes often results in orders of magnitude better performance and lower resource utilization compared to a database with less optimal indexes. Choosing the right set of indexes may be workload, schema, and data dependent. Thus, choosing the right set of indexes can be a challenging task even for expert Database Administrators (DBAs). Being able to identify and implement indexes to improve query performance is a significant value-add for performance management of relational database management systems (RDBMSs). Such index identification may be even more desirable in cloud database platforms, where application developers, who often lack database performance tuning expertise, may provision databases without using a DBA. Another challenge is for Software-as-a-Service (SaaS) vendors and Cloud Software Vendors (CSV) that deploy hundreds to thousands of databases for customers of their applications. Managing such a huge pool of databases is a formidable task even for expert DBAs, where individual DB instances have different schema, queries, and data distributions.

DETAILED DESCRIPTION

Figure 1:
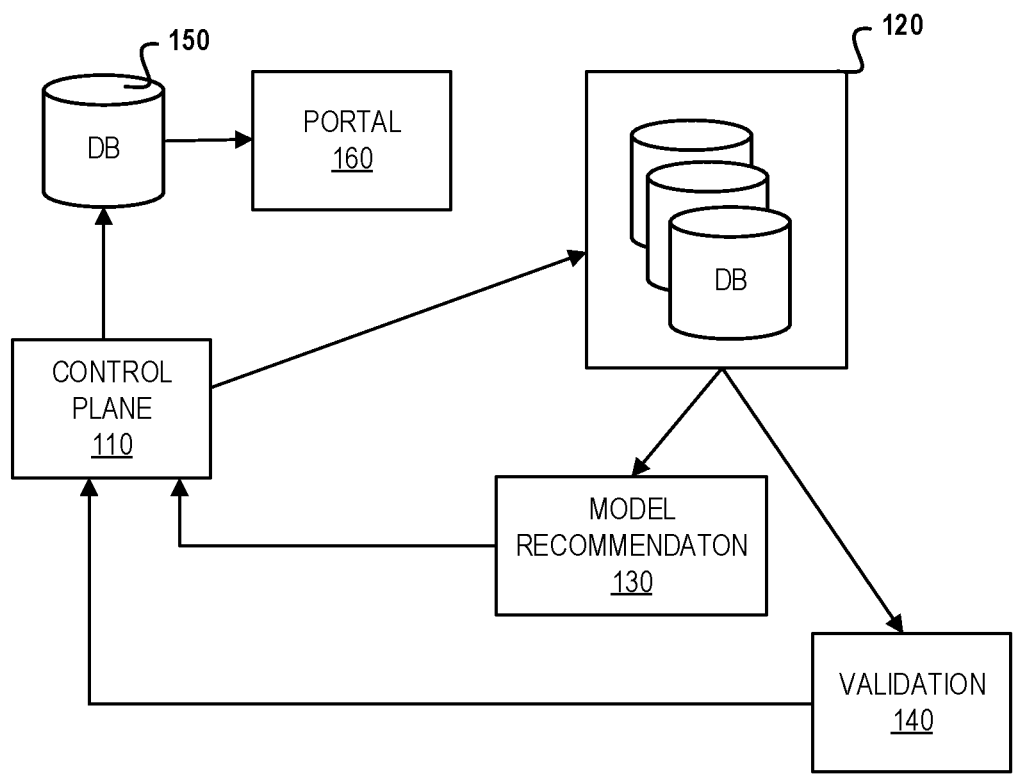
FIG. 1 is a block diagram of a system for optimizing a database in accordance with respective examples.

Current query tuning tools help a DBA in only identifying an appropriate set of indexes for a specified set of inputs. These approaches rely on human intervention for several other critical steps in index management. For example, a DBA may be responsible for several important tasks, such as: (i) identifying a representative workload; (ii) analyzing the database without impacting production instances; (iii) implementing index changes; (iv) ensuring these actions do not adversely affect query performance; and (v) continuously tuning the database as the workload drifts and the data distributions change. Such a human-in-the-loop approach cannot scale for a large number of database, e.g., thousands, millions. Accordingly, a fully automated approach to database tuning would be desirable.

Automated tuning of a database via index management eases performance management of the database. Automated indexing is an important pillar in performance tuning, since an appropriate set of indexes may result in orders of magnitude better performance. Previous systems provide information to a DBA that provided input to the system. Such systems cannot scale for a CSV that has a large number of databases. In various examples, an auto-indexing service analyzes a database's workload, determines a workload to optimize, identifies an appropriate set of indexes to build, implements the indexes, and ensures that the query execution costs improve after implementing the index. This auto-indexing service may continuously tune the database as the workload and data distributions change.

One challenge to scaling index optimization is to remove any input provided by a DBA. With human input any system would not be able to scale to be handle all databases of a CSV. For example, some CSVs have multiple regions worldwide that host millions of databases for tens of thousands of customers. In addition to ensuring the proper health and operation of the auto-indexing service, various examples allow debugging the quality of the recommendations as the workloads and databases change.

There are a number of challenges, however, in removing the expertise provided by a DBA. For example, various examples generate high quality recommendations without knowledge of application semantics or an explicitly-specified workload. In previous systems, where a DBA is involved in the tuning, the DBA has context of the application being tuned which is used to identify a representative workload and appropriately set up the necessary inputs for the tuning task (e.g., the types of indexes to recommend, any constraints such as storage budget or number of indexes, etc.). In various examples these inputs to the index tuner are identified without the knowledge used by a DBA.

As the optimizations are automatically determined and implemented, in various examples, the optimizations are verified using real world database operations rather than estimated costs. For example, known index recommenders may rely on the query optimizer's cost estimates to determine the benefits of a new index configurations. However, the cost estimates may not be accurate with actual query performance (e.g., query latency) or execution cost (e.g., query's CPU time). Due to known limitations of the query optimizer's estimates, there are instances where an index, which is estimated to improve based on the optimizer's cost, makes query execution costs (or performance) worse once implemented. Validating an implemented optimization may be used to identify and correct these scenarios.

Various examples describe a technique and system design that uses an index recommendation software in a fault-tolerant service that may run on thousands of servers and databases at a given instant of time. In addition, a control logic may manage the state of these long-running tuning sessions in the presence of several kinds of failures. To tune the database, a representative workload is obtained, a crucial input to identifying appropriate indexes, by analyzing previous query executions aggregated on the database server. In addition, some examples are directed to a technique for the index recommendations to be "in-sync" with the query optimizer, to ensure that the indexes will be used once implemented, with minimal overheads, working with strict resource constraints, and ensuring minimal impact on the application workload running concurrently with the tuning process. In addition, if a tuning session is impacting or delaying the application's workload may be detected and corrective actions to minimize the impact on the workload may be taken. To test optimizations, experimentation at scale may be done using different recommendation models and flighting new improvements or recommendation modes using additional copies of the database where the workload is being replayed, without impacting the production workload on the primary copy.

FIG. 1 is a block diagram of a system 100 for optimizing a database in accordance with respective examples. A control plane 110 may control an auto-indexing service that is used to optimize databases 120. The control plane 110 may handle management of the databases 120. The control plane 110 may be implemented on one or more computing devices.

The databases 120 may be part of a CSV offerings and may include databases that are setup and managed by end users. End users may provide permission for the control plane 110 to optimize their databases without any interaction with the end user. In an example, the control plane 110 may use index recommenders such as missing indexes, such as the Missing Indexes feature of Azure®, database engine tuning advisor, such as the Database Engine Tuning Advisor of Azure®, or both to optimize the databases 120. The recommenders may run on a node that is co-located with an end user's database for compliance reasons. In some examples, the recommenders are modified to avoid metadata contention with workloads. Metadata contention may occur when objects are created and destroyed within a database. Avoiding contention helps ensure that the recommenders do not interfere with an end user's use of database, as the recommenders may interface with an end user's live database.

A model recommendation 130 may be provided by the recommenders. The model recommendation 130 may include indexes to create, indexes to drop, or both. For example, the model recommendation 130 may use a workload for a database to identify indexes that will decrease the resource consumption of running the workload on the database. In an example, the workload includes database operations, such as selects, deletes, updates, etc. The resource consumption may be the CPU time to execute a query, actual query performance, logical bytes read, etc.

The control plane 110 may take the model recommendations 130 and update the databases 120 accordingly. In an example, a database 150 stores changes to a database. End users may use a portal 160 to access what changes are suggested by the model recommendation 130. The end user may then select which recommendations to implement on the database. The control plane 110 may implement the changes on the database, generating and storing the indexes included in the selected recommendations. In another example, the model recommendation 130 is implemented by the control plane 110 without the end user specifically providing authorization. In various examples, the end user has previously authorized the automatic implementation of the model recommendations 130. In these examples, the model recommendations 130 may still be available for the end user to review and possibly manually revert through the portal 160.

The control plane 110 may monitor a database to determine when to implement the model recommendations 130. For example, the control plane 110 may determine when the database usage over a past period of time is minimal or below a resource threshold and use that time to implement the model recommendations 130.

A validation 140 service monitors a database after the model recommendations 130 were implemented on the database. In an example, the validation 140 service determines if the resource consumption of the database has increased over a period of time after the model recommendations 130 were implemented. If resource consumption has increased, the model recommendations 130 or a portion of the model recommendations 130 may be reverted. In some examples, the validation 140 service may first run the model recommendations 130 on experimental databases.

Figure 2:
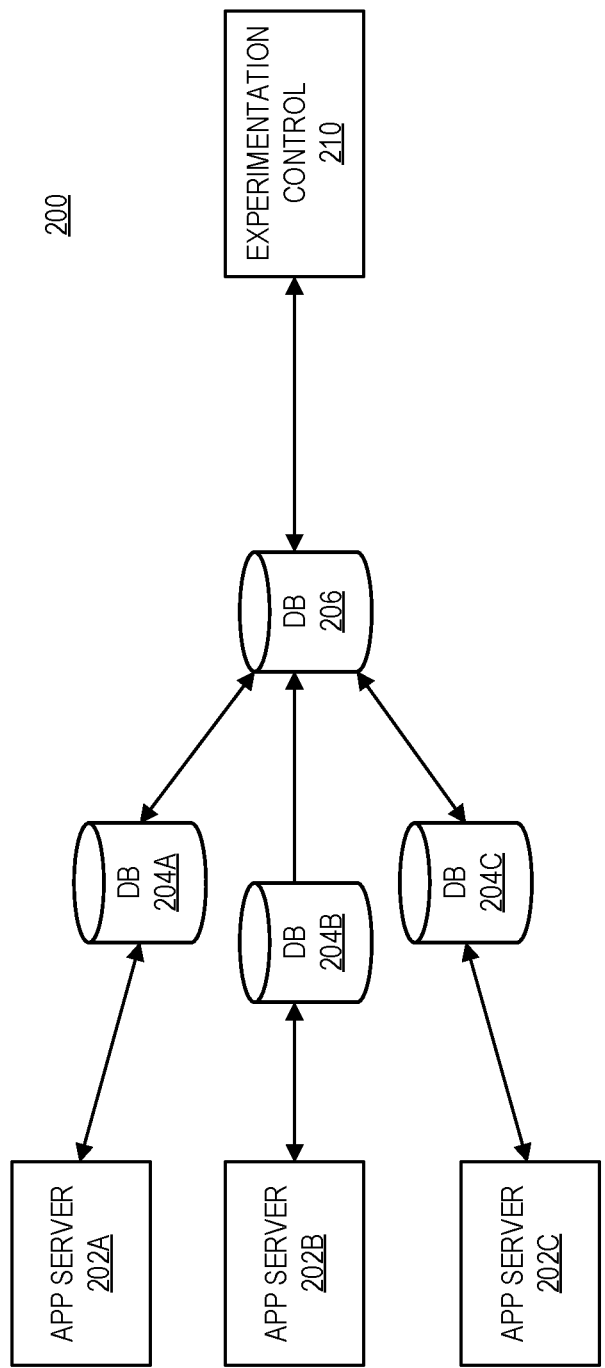
FIG. 2 is a block diagram of a system for validating optimizations of a database in accordance with respective examples.

FIG. 2 is a block diagram of a system 200 for validating optimizations of a database in accordance with respective examples. The control plane 110 may receive recommendations for all of the databases 120 or some number of the databases 120. Rather than implement all of the model recommendations 130 at once, the validation 140 service may validate the model recommendations 130 by implementing the model recommendations 130 on a subset of the databases 120. For example, the validation 140 service which may be part of an experimentation control 210 may create a clone of a database 204B as cloned database 206. In an example, the cloned database 206 is a replica of the database 204B. The model recommendations 130 for the database 204B may be implemented on the cloned database 206. In addition, model recommendations for database 204B and database 204C may be stored for later implementation. In some examples, the control plane 110 may validate the model recommendations 130.

In an example, an application server 202B sends database operations to the database 204B. These operations are executed on the database 204B. In addition, the experimentation control 210 may then execute the same operations on the cloned database 206. Application servers 202A and 202C also send database operations to their respective databases, 204A and 204C. The experimentation control 210 may monitor the resources consumed by the database 204B and the cloned database 206. The experimentation control 210 may monitor the database 204B and the cloned database 206 over a period of time and determine if the resources consumed were less at the cloned database 206 with the model recommendations compared to the database 204B. If the resources consumed are less, then the model recommendations for the databases 204A, 204B and 204C may be implemented. If the resources consumed are not less, then the experimentation control 210 may determine one or more model recommendations that led to an increase in resources consumed. These model recommendations may be removed from the model recommendations for the database 204B and also reverted from the cloned database 206. The experimentation control 210 may then continue to monitor the cloned database 206 for improvements over the database 204B. The experimentation control 210 may monitor hundreds or thousands of cloned databases to ensure that the model recommendations lead to better database performance.

Figure 3:
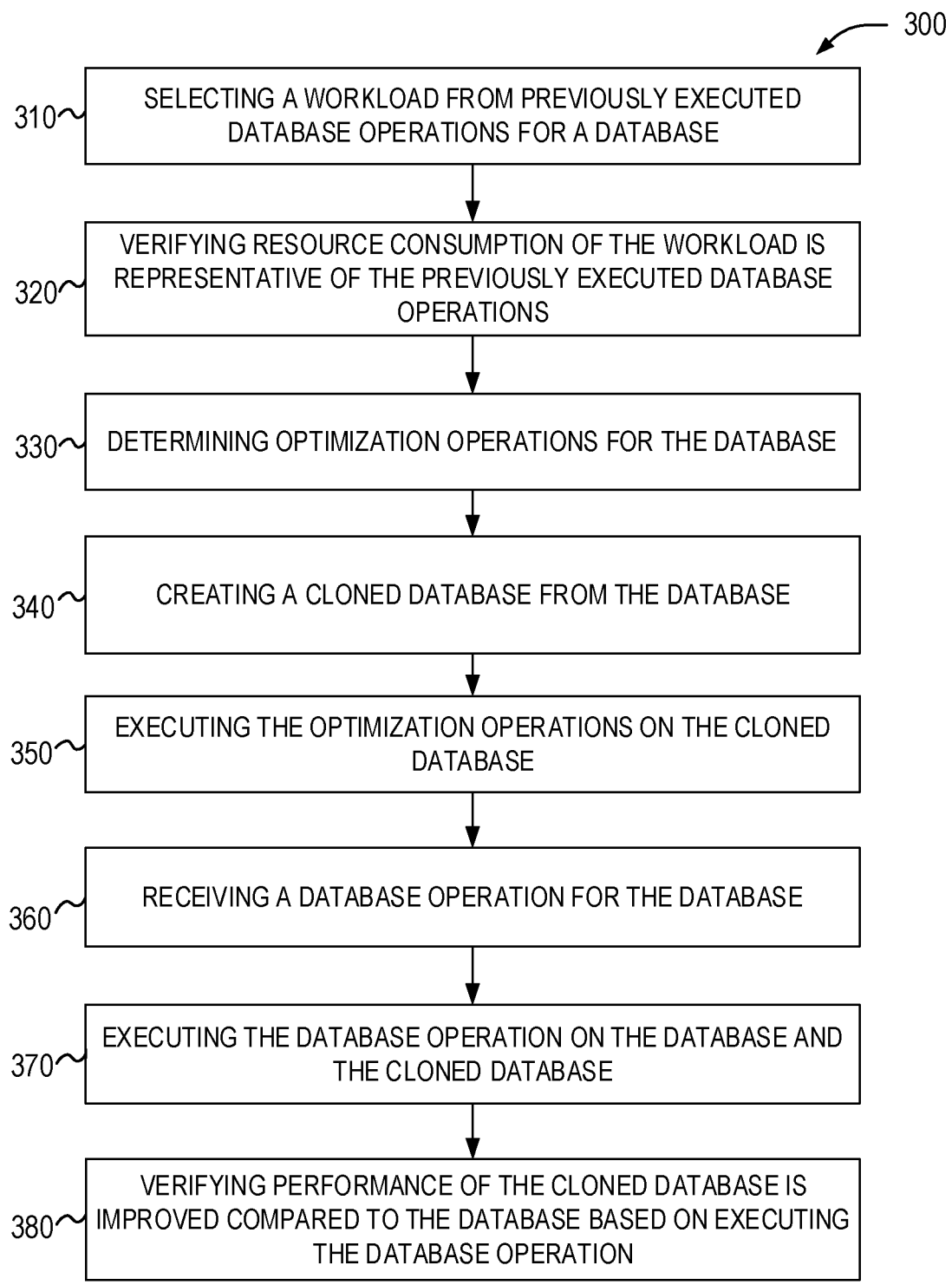
FIG. 3 is a flow diagram of a process for optimizing a database in accordance with respective examples.

FIG. 3 is a flow diagram of a process 300 for optimizing a database in accordance with respective examples. Optimizing a database may include reconfiguring the indexes used by the database. Determining which indexes should be created and which indexes should be dropped is a challenging problem. Previous systems utilized the special knowledge of a DBA to select workloads of database operations that were expensive. Index recommenders use the workload and optimize a database to minimize the estimated total cost of the workload. Accordingly, workload selection is an important step to effectively optimize a database.

For a cloud service provider whose end users may create millions of databases, a way to automatically determine a representative workload allows the database optimizing process scale across the millions of databases. In an example, identifying an appropriate set of indexes for a given database uses a holistic analysis of the database operations, such as queries and updates, that have executed on the database. At 310, a workload is selected from previously executed database operations for a database. The workload will be used to optimize the database. Accordingly, the workload may be representative of how the database is actually used, such that the optimizations impact real-world performance. In various examples, workload coverage is used to determine the workload. For example, workload coverage may be the resources consumed by the database operations of a workload as a percentage of the total resources consumed by all database operations executing on the database over a time period. A high workload coverage, (e.g., greater than 75%, 80%, 90%, etc.), implies that the statements analyzed by the tuner accounts for a significant amount of resources consumed for the database. In various examples, a query store's historical execution statistics is used to compute workload coverage.

At 320, resource consumption of the workload is verified to be representative of the previously executed database operations. In examples, this may be done by determining a total resource consumption of the previously executed database operations and determining a total resource consumption of the workload. The resource consumptions may then be compared to one another. For example, if the resource consumption of the workload is 80% or more of all of the previously executed database operations in a time period, the workload is considered representative. In an example, the workload is generated by sorting the database operations based on cost. Database operations may then be added to the workload until the workload consumes at least the threshold of resources. Different types of operations may also be used to determine if a workload is representative. For example, verifying that a workload includes inserts, updates, drops, etc. may also be done. If any type of operation is missing, a corresponding operation from the previously executed operations may be found and added to the workload.

At 330, database optimization operations for the database are determined. Database optimization operations may include creating and dropping indexes. In an example, the optimization operations may be found using a missing indexes analyzer. In an example, an optimizer searches for an execution plan for a query. The query predicates are analyzed to identify the best indexes in terms of access cost to the data relevant to the predicates. If these indexes do not exist, the query optimizer exposes this information through a missing indexes feature. These indexes are accumulated in a set of dynamic management views (DMVs). The missing indexes have associated details of the predicate in the DMV, e.g., which columns are accessed in an equality predicate, in an inequality predicate, and which columns are needed upstream in the query plan.

In some examples, the missing indexes feature only provides raw information about index candidates for queries. In order to use these candidates to generate the final recommendations, the indexes impact on the entire workload is analyzed. A DMV may also not be persistent. The statistics accumulate over time, but may be reset after a server restart, failover, schema change, or a primary/secondary swap. In some examples, to overcome these limitations periodic snapshots of the DMVs may be taken. The final index recommendations may use the information in the DMVs to generate database optimization operations. The DMV information, however, may need to be modified. For example, the DMV may not specify any ordering of columns in an index. To account for this, a non-clustered (secondary) index candidate may be defined with the EQUALITY columns followed by INEQUALITY columns as the key columns and INCLUDE columns as the additional included columns. If multiple columns are included in each type, then ordering within a type is arbitrary. The DMVs may provide statistics such as the number of queries that triggered the index recommendation, the average optimizer-estimated cost of each query that could be improved, and a percentage improvement expected from the index in the optimizer's estimates. These statistics may be used to determine an aggregated impact of an index. Candidates that have very few query executions (e.g., ad-hoc queries) or which have not appeared in several recent snapshots (e.g., due to significant schema or workload changes), may be filtered out from the recommendations.

As the DMV may accumulate these statistics, really beneficial indexes may have an impact that increases over time. However, to tolerate resets of the DMV, a statistically-robust measure of this positive gradient of the impact scores may be used. For example, a hypothesis test may be formulated to test increasing impact of an index. Assuming that errors are distributed normally, a t-statistic on the slope of an index's impact over time being above a configurable threshold may be calculated. By analyzing these statistics over hundreds of thousands of databases, that for high-impact indexes a few data points are sufficient to surpass the predetermined certainty limit. In addition, to identify opportunities for indexes that benefit multiple queries, opportunities to merge indexes may be explored. In an example, simple rules to only perform conservative merging of indexes, e.g., merge candidates whose key columns are identical but include columns differ were used. In an example to determine optimization operations, the top-k indexes with the highest impact with an impact slope above the threshold may be identified as the indexes to create for the database.

In another example, the optimization operations may be found using a database engine tuning advisor (DTA). In another example, both the missing indexes analyzer and the DTA are used to determine the optimization operations. DTA is a comprehensive physical design tool that given a workload, finds the physical design that minimizes the optimizer-estimated cost of the workload. At the core of DTA is a cost-based search for alternative configurations. For every query in the workload, DTA starts with candidate selection that finds the optimal configuration for the query. Candidates from all queries are used for a workload-level enumeration, which outputs the final recommendation. DTA may use a query optimizer's "what-if" API to cost hypothetical configurations during its search. DTA was designed to be invoked by an expert human administrator who provides a representative workload, sets the appropriate options, and then analyzes the recommendations to determine which ones to implement. To leverage DTA for auto-indexing, DTA was run as an automated service. Enhancements and design changes of DTA included an ability to run DTA with strict resource and cost budgets and minimal impact on any production workloads; automatically acquiring a representative workload for tuning; and running DTA as a service.

During a tuning session, DTA may connect to the database to access metadata, build and read sampled statistics, and make query optimizer calls. Due to the number of calls DTA makes to the server and to satisfy security and compliance requirements, DTA may be run co-located with the primary copy of the database server. Accordingly, DTA may run concurrent with the customer's workload. DTA, therefore, may run with a stringent resource budget to ensure DTA has minimal impact on the customer's workload.

There are at least two ways DTA may impact customer's workloads. Resources consumed by DTA on the server with optimizer calls, creating sampled statistics, etc., may impact a customer's workload. In an example, DTA uses resource governance mechanisms of the database to limit CPU, memory, and I/O consumed by DTA calls. Customer workloads may also be impacted by lock and latch contention that are caused due to creation and dropping of hypothetical indexes and sampled statistics. Such lock contention, especially for modifying metadata, may cause significant impact on user workload due to the first-in-first-out nature of the database's lock scheduler. In various examples, low priority locking support that allows requesting a lock with lower priority, without blocking lock requests by a user's workload, is used. In an example, DTA was also modified to reduce the number of sampled statistics created by DTA by without noticeable impact on recommendation quality. To further minimize the resource footprint, the control plane may invoke DTA on-demand only when analysis of a database is needed.

As noted above, DTA uses a workload input which is used to tune the database. In an example, past execution statistics and query text captured by a query store are used to construct the workload. For example, at the start of a DTA session, the execution statistics for the past N hours are used to identify the K query statements (or templates) which are most expensive in terms of duration or resources (e.g., CPU time). Since this analysis may be resource intensive for database with many queries accumulating gigabytes of data in the query store, N and K are set based on the amount of resources available to the database.

Identifying the database statements to tune is only a start. In some examples, DTA uses the full query statements in the workload to estimate its cost for the different hypothetical index configurations. While query store captures the query text, the query text may not be complete statements. For example, statements in the query store may be missing variables, or only have a fragment of a complex conditional statements, etc. DTA may not be able to estimate a cost for such statements. Another challenge arises from statements that cannot be optimized in isolation or is not supported in the "what-if" API. For instance, in a batch of statements, one statement can store a result of a query into a temporary table, and then another statement can reference this temporary table. Such batches may only be optimized during execution. These limitations restrict the set of statements DTA can successfully tune, often significantly impacting DTA's workload coverage.

In various examples, several enhancements were made to overcome these limitations. First, database statements were augmented from other sources. For instance, if statements are part of stored procedures or functions whose definition is available in system meta-data, the statements from meta-data are obtained. Second, for incomplete T-SQL batches, the database server's query plan cache was used to obtain the full batch definition. In addition, some statements were rewritten. For instance, BULK INSERT statement used by bulk load tools or APIs may not be optimized. These statements, however, may be rewritten into equivalent INSERT statements which may be optimized, thus allowing DTA to cost the index maintenance overheads due to these operations. In addition, since the above statement types are optimized by the database engine during execution, the missing index feature may generate candidates if these statements can benefit from indexes. The DTA's search may be augmented with these missing index candidates and the optimizer's cost estimates when generating the missing index candidates. Once DTA completes analyzing a database, a detailed report is produced specifying which statements DTA analyzed and which indexes in the recommendation will impact which statement. This report may be used to expose the recommendation details to the users. In addition, the reports may be used to compute the workload coverage which provides an approximate measure of the effectiveness of DTA's recommendations.

A DTA tuning session for a database may run for minutes to hours, depending on the complexity of the workload, schema, and available resources. There can be several types of failures during a DTA session, either on the database server, the physical server, or within DTA. There could be DTA sessions on thousands of databases at a given instant of time for a CSV. To tolerate failures and manage the state of DTA sessions at-scale, a micro-service may be used in the control plane that is dedicated to DTA session management. In addition, a database's state may be augmented with DTA session states. The micro-service may identify when to invoke a DTA session on a given database, tracks progress of the DTA session, and ensures that the session reaches a terminal state of either successful completion or an error which would trigger a cleanup and an optional retry. The cleanup phase properly cleans up temporary objects (e.g., hypothetical indexes and statistics) that DTA creates during tuning and other tuning session-specific state such as temporary files, etc.

The two advisors discussed above generate recommendations to create indexes. The recommendations exposed to the customers are from one of these advisors. There are several factors that determine which advisor's recommendations will be surfaced, which includes the service tier (or SLO) for the database, the workload coverage of the two advisors, activity levels and resource consumption, etc. For example, the recommendations from the advisor with the largest resource consumption coverage may be exposed. In another example, recommendations from both of the advisors are combined. The combination of the recommendations may be based on the indexes that have the greatest estimated impact on the workload.

As the workload, schema, and data distributions evolve and new indexes are created, the benefit of existing indexes may decrease. It can be useful to identify and potentially drop low impact indexes to reduce their maintenance overhead and storage space. In addition, databases may have several duplicate indexes, i.e., indexes with identical key columns (including identical order), which were also potential candidates to be dropped. Dropping indexes, however, pose several practical challenges. First, users often have indexes for occasional but important queries, such as reports at some cadence such as daily or weekly. Since the workload is automatically identified, such infrequent events may not be part of the workload and hence ignored in analysis when determining the impact of an index. Dropping such indexes may cause significant slowdown for these occasional queries, which are also hard to detect in validation due to their infrequent nature. Second, queries may hint indexes to use when users manually tune queries or force a plan. Dropping such a hinted index would prevent the query to execute, potentially breaking the application and causing serious disruptions. Third, even when duplicate indexes are detected, identifying which one to drop may be a challenge. In many cases, retaining any one of them is acceptable, while in some other cases, a specific one (or many) may be preferred.

In an example, a conservative approach is used to identify indexes to drop that have minimal risk of regressions. Instead of being purely workload-driven, other sources of information from the database server may be used to identify low impact indexes. For example, execution statistics over a significantly longer time period (usually 60 days or more) may be used. In some examples, the goal of dropping indexes is to reduce maintenance overhead, with storage reduction being another goal. Statistics from the database server, such as how frequently an index is accessed by a query, how much the database is modified etc., to identify indexes that do not benefit queries but have significant maintenance overheads. Query hints and force plans may be used to identify indexes to avoid dropping. The schema and databases metadata may be analyzed to identify indexes enforcing an application-specified constraint so that index is not dropped.

In some examples, the recommendations may be applied based on the end user's approval or automatically. In other examples, the recommendations are first tested prior to implementation on a live database. When a user decides to apply a recommendation or if auto-implementation is enabled, the control plane may orchestrate index implementation (either create or drop) and subsequent validation to ensure there are no regressions. Depending on the size of the index, creation may be a resource-intensive operation that scans the data (I/O intensive), sorts the data (CPU and memory intensive), and then creates the index (log intensive). The impact of creating indexes may be reduced by governing the resources and scheduling most of the operations during periods of low activity for the database. In some examples, to further minimize impact on concurrent workload, only online operations, i.e., operations that can be completed with minimal or no blocking are used. Since this creation operation can be long-running, in some examples, a micro-service in the control plane tracks the state machine of the index implementation.

The goal of validation is to detect that creating or dropping an index does not cause query regressions. If a regression is detected, any dropped indexes may be recreated and created indexes may be dropped. In various examples, the query store is used to analyze execution statistics before and after the index change is implemented. One major challenge encountered in validation is the inherent noise in the execution statistics due to concurrent query executions in an uncontrolled production setting.

To overcome this challenge, logical execution metrics such as CPU time consumed, or logical bytes read may be analyzed. These metrics are representative of plan quality and also have less variance compared to physical metrics such as query duration or physical I/O. If the logical metrics improve due to an index, the physical metrics generally improve. In some examples, only queries that have executed before and after the index change and had a plan change due to the index change. That is, if an index is created, the new plan after creation should reference the index, while if an index is dropped, the old plan before drop should reference the index. In addition, for every query plan, the query store may track the number of executions, average, and standard deviation for every metric. Assuming the measurement variance follows a normal distribution, the above statistics and Welch t-test may be used to determine the statistical significance of a change (either improvement or regression) of the metrics, comparing the state after the index change with that before the change.

If a significant regression is detected, the system may automatically revert the change, i.e., drop the index if created, or recreate if the index was dropped. This revert trigger may be set to a conservative setting where a significant regression for any statement that consumes a significant fraction of the database's resources may trigger a revert. Without explicit application knowledge or user inputs, this approach tries to minimize disruption, though might also reduce holistic improvements other statements may have benefitted from this index which will now be reverted since one statement regressed due to the index. An alternative setting measures the holistic improvement of all statements affected by the index and reverts only on regression at an aggregate level. This approach may significantly regress one or more statements if improvements to other statements offset the regressions.

In some examples, database optimization changes may be tested prior to implementation with live data. At 340, a cloned database may be created from the database that was used to generate the data optimization operations. In some examples, the experimentation may be similar to A/B testing used in randomized experiments but adapted to the context of databases.

Databases may exhibit huge diversity in schema, queries, data sizes, and data distributions. Hence, to experiment with multiple index recommenders and measure the quality in terms of execution cost of the recommenders, the same set of databases are used to generate recommendations, implement them, and compare the execution costs before and after the implementation. Performing this experimentation on the primary database copy serving application traffic is risky and unacceptable. Even using a secondary replica is not feasible since some database engines require the replicas to be physically identical.

In some examples, the cloned database is used as a B-instance of a database. A B-instance is a clone of the database, that may be invisible to external customers, that starts with a snapshot of the database. The B-instance may be on a different physical server within the compliance boundary of the database engine with an independent set of resources and different security credentials and may also use a different database server binary.

At 350, the optimization recommendations are executed on the cloned database. In some examples, each recommender has its own B-instance. In these examples, the optimization recommendations for one recommender is executed on its corresponding cloned database. This allows recommendations from different recommenders to be compared to one another.

At 360, the cloned database receives a database operation from the original database. For example, a cloned database may receive a fork of the Tabular Data Stream (TDS) traffic from the primary copy (called an A-instance in this context) which is replayed on the B-instance. At 370, the database operation is executed on the database and on the cloned database. The B-instance may independently execute the TDS stream, allowing reordering of operations, etc. A failure of the B-instance does not affect the A-instance's ability to progress normally. Hence, the B-instance is a best-effort clone and may potentially diverge from the A-instance.

Creating a B-instance is one small step in an experiment. Another step is to identify suitable candidate databases for the experiment, generate the recommendations, implement them, collect execution statistics, generate reports comparing the state with and without the recommendations, and perform custom steps needed for specific experiments. In an example, the databases with the most recommendations or greatest potential improvement are selected as the candidate databases. In an example, the top 3%, 5%, 10%, etc., may be selected as candidate databases to test. To scale these experiment steps to hundreds or thousands of databases across different geographical regions, the framework in FIG. 2 may be used. The experimentation control 210 ensures that workflow steps of an experiment are executed.

The performance of the cloned database may be compared to the performance of the live database. At 380, the performance of the cloned database is verified as improved compared to the performance of the live database. As noted above, performance may be based on specific statements or aggregated statements. In some examples, once the performance improvement is verified, the database recommendations may be implemented on the live database. If no improvement was found, the database recommendations may be ignored. In some examples, a particular index may be identified as regressing the performance of one or more queries. When this occurs, the command to create this index may be removed from the recommendations. The modified recommendations may then be executed, such that the index that regressed the queries is not created.

In some cases, customers may want to exercise more control on how and when the index recommendations are implemented, e.g., implementing the recommendations as soon as possible, implementing them only during low periods of activity, implementing them on a pre-specified schedule, or implementing only after successful completion of experiments. Customers may also want to control how resources are shared between index creation and concurrent transactions. In some examples, indexes that benefited a number of databases for a customer were implemented.

Figure 4:
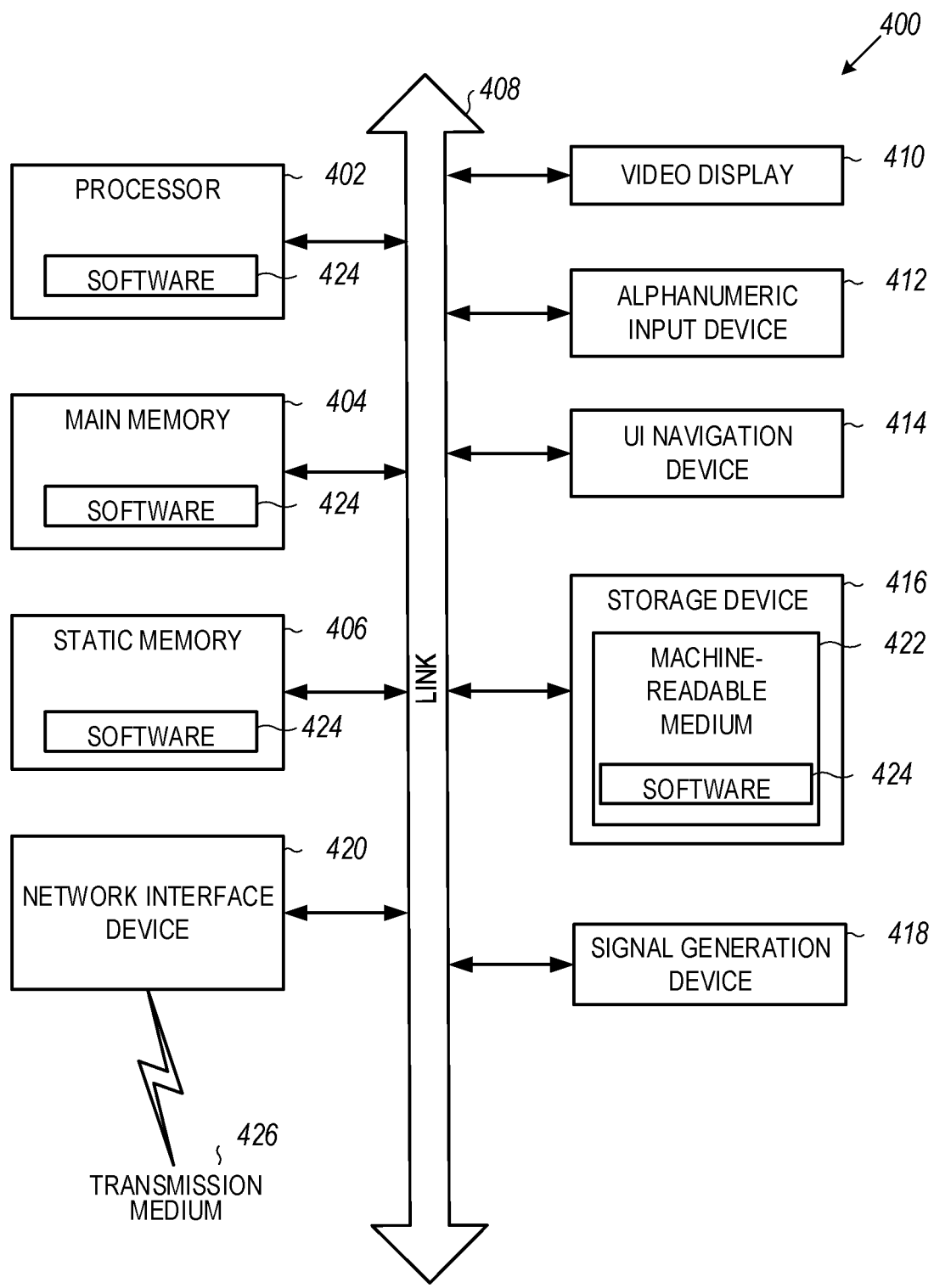
FIG. 4 is an example computing device that can be used in conjunction with the technologies described herein.

FIG. 4 is an example computing device that can be used in conjunction with the technologies described herein. In alternative embodiments, the computing device 400 may operate as a standalone device or may be connected (e.g., networked) to other computing devices. In a networked deployment, the computing device 400 may operate in the capacity of a server communication device, a client communication device, or both in server-client network environments. In an example, the computing device 400 may act as a peer computing device in peer-to-peer (P2P) (or other distributed) network environment. The computing device 400 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may implement the OCR system 120, the aligner 130, the tokenizer 140, the cluster 150, the table extractor 310, and the table combiner 320, and perform the method of FIG. 5.

Computing device 400 may include a hardware processor 402 (e.g., a central processing unit (CPU), a graphics processing unit (GPU), a hardware processor core, or any combination thereof), a main memory 404 and a static memory 406, some or all of which may communicate with each other via a link (e.g., bus) 408. The computing device 400 may further include a display unit 410, an input device 412 (e.g., a keyboard), and a user interface (UI) navigation device 414 (e.g., a mouse). In an example, the display unit 410, input device 412, and UI navigation device 414 may be a touch screen display. In an example, the input device 412 may include a touchscreen, a microphone, a camera (e.g., a panoramic or high-resolution camera), physical keyboard, trackball, or other input devices.

The computing device 400 may additionally include a storage device (e.g., drive unit) 416, a signal generation device 418 (e.g., a speaker, a projection device, or any other type of information output device), a network interface device 420, and one or more sensors 421, such as a global positioning system (GPS) sensor, compass, accelerometer, motion detector, or other sensor. The computing device 400 may include an input/output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 416 may include a computing-readable (or machine-readable) storage media 422, on which is stored one or more sets of data structures or instructions 424 (e.g., software) embodying or utilized by any one or more of the techniques or functions described herein. In an example, at least a portion of the software may include an operating system and/or one or more applications (or apps) implementing one or more of the functionalities described herein. The instructions 424 may also reside, completely or at least partially, within the main memory 404, within the static memory 406, and/or within the hardware processor 402 during execution thereof by the computing device 400. In an example, one or any combination of the hardware processor 402, the main memory 404, the static memory 406, or the storage device 416 may constitute computing device (or machine) readable media.

While the computer-readable storage media 422 is illustrated as a single medium, a "computer-readable storage media" or "machine-readable storage media" may include a single medium or multiple media (e.g., a centralized or distributed database, and/or associated caches and servers) configured to store the one or more instructions 424.

In an example, a computer-readable storage media or machine-readable storage media may include any medium that is capable of storing, encoding, or carrying instructions for execution by the computing device 400 and that cause the computing device 400 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM), and optical media disks. The computer-readable storage media is non-transitory in that the storage media does not consist of transitory propagating signals.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 420 may use the transfer protocols to transmit data using transitory propagating signals.

In an example, the network interface device 420 may include one or more physical jacks (e.g., Ethernet, coaxial, or phone jacks) or one or more antennas to connect to the communications network 426. In an example, the network interface device 420 may include one or more wireless modems, such as a Bluetooth modem, a Wi-Fi modem or one or more modems or transceivers operating under any of the communication standards mentioned herein. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques. In an example, a transmission medium may include any intangible medium that is capable of storing, encoding or carrying instructions for execution by the computing device 400, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

EXAMPLES

Example 1 is a method for reconfiguring a database, the method comprising: selecting, from previously executed database operations on the database, a workload comprising a plurality of the previously executed database operations; determining a total resource consumption of the previously executed database operations; determining a total resource consumption of the workload; verifying the total resource consumption of the workload is more than a predetermined threshold of the total resource consumption of the previously executed database operations; determining optimization operations for the database using the workload; creating a cloned database of the database; executing the optimization operations on the cloned database; receiving a database operation for the database; executing the database operation on the database and the cloned database; and verifying performance of the cloned database is improved compared to the performance of the database based on the executing of the database operation on the database and the cloned database.

In Example 2, the subject matter of Example 1 includes, executing the optimization operations on the database based on the verifying the performance of the cloned database.

In Example 3, the subject matter of Examples 1-2 includes, determining performance of the cloned database is not improved for at least one of the optimization operations; removing the at least one of the optimization operations from the optimization operations; and reverting the at least one of the optimization operations on the cloned database.

In Example 4, the subject matter of Examples 1-3 includes, wherein the resource consumption comprises a central processing unit time.

In Example 5, the subject matter of Example 4 includes, %.

In Example 6, the subject matter of Examples 1-5 includes, wherein the optimization operations comprise creating an index.

In Example 7, the subject matter of Examples 1-6 includes, rewriting one of the previously executed database operations, wherein the workload comprises the rewritten database operation.

In Example 8, the subject matter of Example 7 includes, wherein rewriting one of the previously executed database operations comprises rewriting a bulk insert operation as an insert operation.

In Example 9, the subject matter of Examples 1-8 includes, modifying one of the previously executed database operations, wherein the workload comprises the modified database operation.

In Example 10, the subject matter of Example 9 includes, wherein modifying one of the previously executed database operations comprises: retrieving metadata of a stored procedure, wherein the one of the previously executed database operations uses the stored procedure; and replacing the stored procedure used in the one of the previously executed database operations with the metadata.

Example 11 is a system for database reconfiguration, the system comprising: an electronic processor configured to: select, from previously executed database operations on the database, a workload comprising a plurality of the previously executed database operations; determine a total resource consumption of the previously executed database operations; determine a total resource consumption of the workload; verify the total resource consumption of the workload is more than a predetermined threshold of the total resource consumption of the previously executed database operations; determine optimization operations for the database using the workload; create a cloned database of the database; execute the optimization operations on the cloned database; receive a database operation for the database; execute the database operation on the database and the cloned database; and verify performance of the cloned database is improved compared to the performance of the database based on the executing of the database operation on the database and the cloned database.

In Example 12, the subject matter of Example 11 includes, wherein the electronic processor is further configured to execute the optimization operations on the database based on the verifying the performance of the cloned database.

In Example 13, the subject matter of Examples 11-12 includes, wherein the electronic processor is further configured to: determine performance of the cloned database is not improved for at least one of the optimization operations; remove the at least one of the optimization operations from the optimization operations; and revert the at least one of the optimization operations on the cloned database.

In Example 14, the subject matter of Examples 11-13 includes, wherein the resource consumption comprises a central processing unit time.

In Example 15, the subject matter of Example 14 includes, %.

In Example 16, the subject matter of Examples 11-15 includes, wherein the optimization operations comprise creating an index.

In Example 17, the subject matter of Examples 11-16 includes, wherein the electronic processor is further configured to rewrite one of the previously executed database operations, wherein the workload comprises the rewritten database operation.

Example 18 is a non-transitory computer-readable storage medium storing computer-executable instructions for database reconfiguration, the stored instructions comprising: instructions to select, from previously executed database operations on the database, a workload comprising a plurality of the previously executed database operations; instructions to determine a total resource consumption of the previously executed database operations; instructions to determine a total resource consumption of the workload; instructions to verify the total resource consumption of the workload is more than a predetermined threshold of the total resource consumption of the previously executed database operations; instructions to determine optimization operations for the database using the workload; instructions to create a cloned database of the database; instructions to execute the optimization operations on the cloned database; instructions to receive a database operation for the database; instructions to execute the database operation on the database and the cloned database; and instructions to verify performance of the cloned database is improved compared to the performance of the database based on the executing of the database operation on the database and the cloned database.

In Example 19, the subject matter of Example 18 includes, wherein the instructions further comprise instructions to execute the optimization operations on the database based on the verifying the performance of the cloned database.

In Example 20, the subject matter of Examples 18-19 includes, wherein the instructions further comprise: instructions to determine performance of the cloned database is not improved for at least one of the optimization operations; instructions to remove the at least one of the optimization operations from the optimization operations; and instructions to revert the at least one of the optimization operations on the cloned database.

In Example 21, the subject matter of Examples 1-20 includes, wherein the optimization operations comprise dropping an index.

1 Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer implemented method for tuning database, the method comprising:
    selecting, from previously executed database operations on the database, a workload comprising a plurality of the previously executed database operations
    determining a total computing resource consumption of the previously executed database operations;
    determining a total computing resource consumption of the workload;
    verifying the total computing resource consumption of the workload is more than a predetermined threshold of the total computing resource consumption of the previously executed database operations;
    determining optimization operations for the database using the workload;
    creating a cloned database of the database;
    executing the optimization operations on the cloned database to tune the cloned database;
    receiving a database operation for the database;
    executing the database operation on the database and the tuned cloned database;
    determining computing resource consumption of execution of the database operation on the database and the tuned cloned database; and
    verifying performance of the tuned cloned database is improved compared to performance of the database based on the determined computing resources consumed by execution of the database operation on the database and the tuned cloned database.

2. The method of claim 1, further comprising executing the optimization operations on the database based on the verifying the performance of the tuned cloned database.

3. The method of claim 1, further comprising:
    determining performance of the tuned cloned database is not improved for at least one of the optimization operations;
    removing the at least one of the optimization operations from the optimization operations; and
    reverting the at least one of the optimization operations on the tuned cloned database.

4. The method of claim 1, wherein the resource consumption is expressed as a central processing unit time.

5. The method of claim 1, wherein the optimization operations comprise creating an index.

6. The method of claim 1, further comprising rewriting one of the previously executed database operations, wherein the workload comprises the rewritten database operation.

7. The method of claim 1, further comprising modifying one of the previously executed database operations, wherein the workload comprises the modified database operation.

8. The method of claim 7, wherein modifying one of the previously executed database operations comprises:
    retrieving metadata of a stored procedure, wherein the one of the previously executed database operations uses the stored procedure; and
    replacing the stored procedure used in the one of the previously executed database operations with the metadata.

9. The method of claim 1, wherein determining optimization operations for the database using the workload comprises executing the workload using lower priority locking compared to a priority locking used by a concurrent user workload.

10. The method of claim 1, wherein determining optimization operations for the database using the workload comprises:
    determining a first set of optimization operations using a first recommender;
    determining a second set of optimization operations using a second recommender;

selecting the first set of optimization operations or the second set of optimization operations based on a user preference.

11. A system for tuning a database, the system comprising:
an electronic processor configured to:
select, from previously executed database operations on the database, a workload comprising a plurality of the previously executed database operations;
determine a total computing resource consumption of the previously executed database operations;
determine a total computing resource consumption of the workload;
verify the total computing resource consumption of the workload is more than a predetermined threshold of the total computing resource consumption of the previously executed database operations;
determine optimization operations for the database using the workload;
create a cloned database of the database;
execute the optimization operations on the cloned database to tune the cloned database;
receive a database operation for the database;
execute the database operation on the database and the tuned cloned database;
determine computing resource consumption of execution of the database operation on the database and the tuned cloned database; and
verify performance of the cloned database is improved compared to performance of the database based on the determined computing resources consumed by execution of the database operation on the database and the tuned cloned database.

12. The system of claim 11, wherein the electronic processor is further configured to execute the optimization operations on the database based on the verifying the performance of the tuned cloned database.

13. The system of claim 11, wherein the electronic processor is further configured to:
determine performance of the tuned cloned database is not improved for at least one of the optimization operations;
remove the at least one of the optimization operations from the optimization operations; and
revert the at least one of the optimization operations on the tuned cloned database.

14. The system of claim 11, wherein the resource consumption is expressed as a central processing unit time.

15. The system of claim 14, wherein the predetermined threshold is 80%.

16. The system of claim 11, wherein the optimization operations comprise creating an index.

17. The system of claim 11, wherein the electronic processor is further configured to rewrite one of the previously executed database operations, wherein the workload comprises the rewritten database operation.

18. A non-transitory computer-readable storage medium storing computer-executable instructions for tuning a database, the stored instructions comprising:
instructions to select, from previously executed database operations on the database, a workload comprising a plurality of the previously executed database operations;
instructions to determine a total computing resource consumption of the previously executed database operations;
instructions to determine a total computing resource consumption of the workload;
instructions to verify the total computing resource consumption of the workload is more than a predetermined threshold of the total computing resource consumption of the previously executed database operations;
instructions to determine optimization operations for the database using the workload;
instructions to create a cloned database of the database;
instructions to execute the optimization operations on the cloned database to tune the cloned database;
instructions to receive a database operation for the database;
instructions to execute the database operation on the database and the tuned cloned database;
instructions to determine computing resource consumption of execution of the database operation on the database and the tuned cloned database; and
instructions to verify performance of the cloned database is improved compared to performance of the database based on the determined computing resources consumed by execution of the database operation on the database and the tuned cloned database.

19. The non-transitory computer-readable storage medium of claim 18, wherein the instructions further comprise instructions to execute the optimization operations on the database based on the verifying the performance of the tuned cloned database.

20. The non-transitory computer-readable storage medium of claim 18, wherein the instructions further comprise:
instructions to determine performance of the tuned cloned database is not improved for at least one of the optimization operations;
instructions to remove the at least one of the optimization operations from the optimization operations; and
instructions to revert the at least one of the optimization operations on the tuned cloned database.

* * * * *